United States Patent
Enko et al.

(10) Patent No.: US 7,472,143 B2
(45) Date of Patent: Dec. 30, 2008

(54) FILE MIGRATION DEVICE

(75) Inventors: Yutaka Enko, Sagamihara (JP); Naohiro Fujii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 550 days.

(21) Appl. No.: 10/645,699

(22) Filed: Aug. 20, 2003

(65) Prior Publication Data

US 2004/0210583 A1 Oct. 21, 2004

(30) Foreign Application Priority Data

Apr. 21, 2003 (JP) ............................. 2003-115183

(51) Int. Cl.
*G06F 7/00* (2006.01)
(52) U.S. Cl. .................... 707/205; 707/10; 709/241
(58) Field of Classification Search ............ 709/241, 709/227, 203; 711/161; 707/103 X, 205
See application file for complete search history.

(56) References Cited

U.S. PATENT DOCUMENTS

| | | | |
|---|---|---|---|
| 5,367,698 A | 11/1994 | Webber et al. | |
| 5,544,347 A * | 8/1996 | Yanai et al. | 711/162 |
| 5,564,037 A | 10/1996 | Lam | |
| 6,026,414 A * | 2/2000 | Anglin | 707/204 |
| 6,256,675 B1 * | 7/2001 | Rabinovich | 709/241 |
| 6,366,988 B1 | 4/2002 | Skiba et al. | |
| 6,442,601 B1 * | 8/2002 | Gampper et al. | 709/218 |
| 6,477,522 B1 | 11/2002 | Young | |
| 6,484,204 B1 * | 11/2002 | Rabinovich | 709/226 |
| 2001/0002472 A1 * | 5/2001 | Kanai et al. | 709/217 |
| 2002/0004890 A1 * | 1/2002 | Ofek et al. | 711/161 |
| 2002/0091746 A1 * | 7/2002 | Umberger et al. | 709/105 |
| 2002/0147881 A1 | 10/2002 | Pudipeddi et al. | |
| 2002/0178233 A1 | 11/2002 | Mastrianni et al. | |
| 2003/0039148 A1 * | 2/2003 | Riedle | 365/189.08 |
| 2004/0181605 A1 * | 9/2004 | Nakatani et al. | 709/233 |

(Continued)

FOREIGN PATENT DOCUMENTS

JP 01-197854 A 8/1989

(Continued)

OTHER PUBLICATIONS

Candan et al., "Enabling Dynamic Content Caching for Database-Driven Web Sites", ACM SIGMOD, [online],May 21-24, 2001, [retrieved on Sep. 17, 2008]. Retrieved from the Internet:<URL: http://portal.acm.org/citation.cfm?id=375663.375736&coll=ACM&dl=ACM&CFID=3083011&CFTOKEN=93737709>.*

(Continued)

*Primary Examiner*—Jean B Fleurantin
*Assistant Examiner*—Dennis Myint
(74) *Attorney, Agent, or Firm*—Townsend and Townsend and Crew LLP

(57) ABSTRACT

In a network system in which clients and file servers are connected by networks and a client makes access to a file stored in a disk storage device of a file server via the networks, accessibility to a file of a file server distant from the client tends to be deteriorated. In order to resolve the problem, the file server having the file searches for an appropriate file server in the proximity of the client and transfers the file to the appropriate file server (migration target server). Thereafter, the client makes access to the migration target server for the file.

17 Claims, 16 Drawing Sheets

U.S. PATENT DOCUMENTS

| | | | |
|---|---|---|---|
| 2004/0221024 A1* | 11/2004 | Yamada et al. | 709/222 |
| 2005/0071421 A1* | 3/2005 | Calo et al. | 709/203 |
| 2006/0036892 A1* | 2/2006 | Sunna | 714/4 |
| 2007/0136393 A1* | 6/2007 | Fung et al. | 707/202 |

FOREIGN PATENT DOCUMENTS

| | | |
|---|---|---|
| JP | 03-091041 A | 4/1991 |
| JP | A-6-243074 | 9/1994 |
| JP | 07-084855 A | 3/1995 |

OTHER PUBLICATIONS

Herlihy, Maurice, "Concurrency versus Availability: Atomic Mechanisms for Replicated Data", ACM Transactions on Computer Systems, vol. 5, No. 3, 2419-274, [online], Aug. 1987 [retrieved on Sep. 17, 2008]. Retrieved from the Internet:<URL: http://delivery.acm.org/10.1145/30000/27643/p249-herlihy.pdf?key1=27643&key2=5837761221&coll=GUIDE&dl=GUID>.*

Japan Patent Office (JPO) office action dated Sep. 09, 2008 for JPO patent application JP2003-115183.

* cited by examiner

FIG.2A

| TARGET (SERVER) | 200.0.0.101 |
|---|---|
| SOURCE (CLIENT) | 100.0.0.1 |
| REQUEST TYPE | read |
| REQUEST PATH NAME | /doc/misc/sample.log |
| OFFSET [byte] | 4096 |
| SIZE [byte] | 1024 |

FIG.2B

| TARGET (SERVER) | 200.0.0.101 |
|---|---|
| SOURCE (CLIENT) | 100.0.0.1 |
| REQUEST TYPE | write |
| REQUEST PATH NAME | /doc/misc/sample.log |
| OFFSET [byte] | 4096 |
| SIZE [byte] | 1024 |
| DATA | DATA |

FIG.2C

| TARGET (SERVER) | 100.0.0.1 |
|---|---|
| SOURCE (CLIENT) | 200.0.0.101 |
| REQUEST TYPE | read |
| REQUEST PATH NAME | /doc/misc/sample.log |
| OFFSET [byte] | 4096 |
| SIZE [byte] | 1024 |
| DATA | DATA |

FIG.2D

| TARGET (SERVER) | 100.0.0.1 |
|---|---|
| SOURCE (CLIENT) | 200.0.0.101 |
| REQUEST TYPE | write |
| REQUEST PATH NAME | /doc/misc/sample.log |
| OFFSET [byte] | 4096 |
| SIZE [byte] | 1024 |

| ACCESSED FILE PATH (601) | REQUESTER NETWORK (602) | DISTANCE (603) | NUMBER OF ACCESS (604) | ACCESS START TIME (605) |
|---|---|---|---|---|
| /doc/misc/record.out | 100.0.0.0/24 | 5 | 120 | 2002/9/1 10:00:00 |
| /doc/misc/sample.log | 100.0.0.0/24 | 5 | 85 | 2002/9/2 11:00:00 |
| /doc/memo.txt | 200.0.0.0/24 | 1 | 45 | 2002/9/2 11:00:05 |
| | | | | |

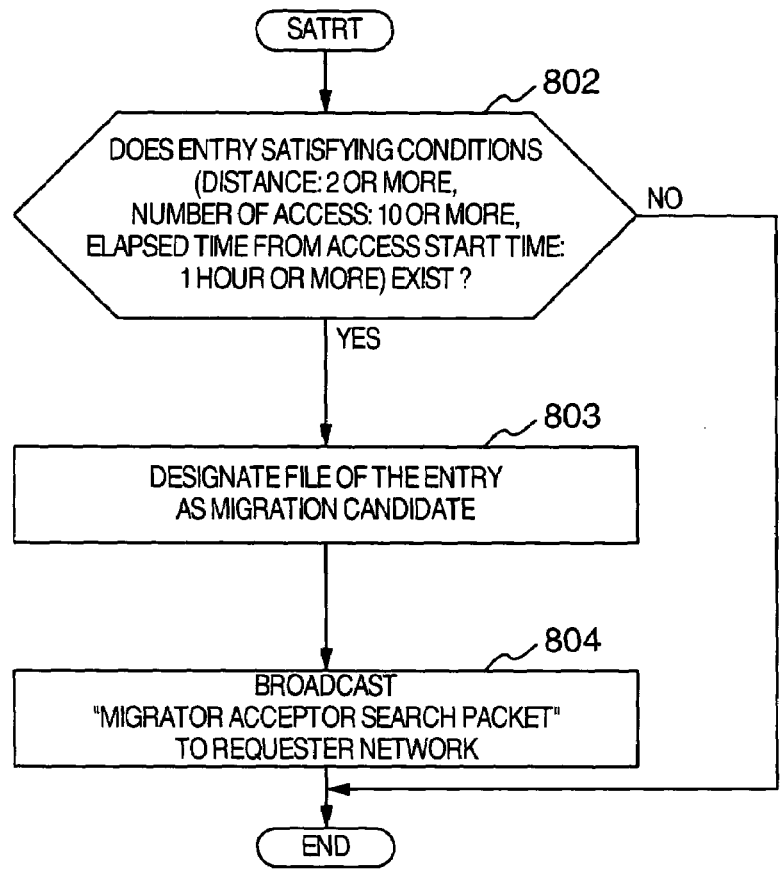

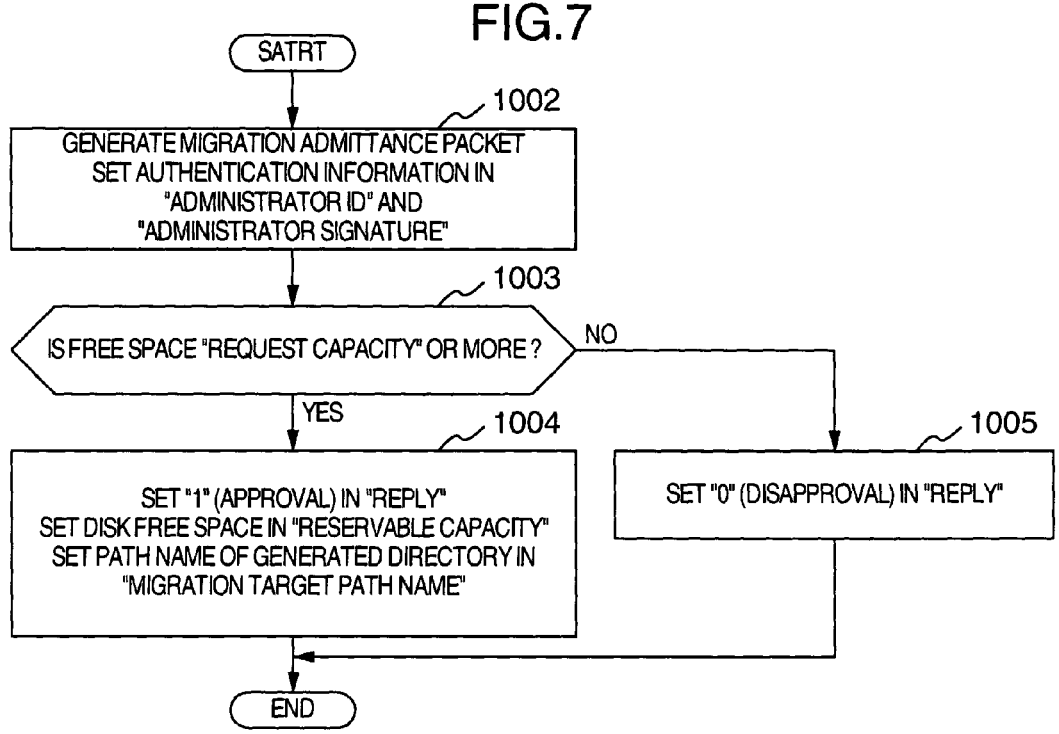

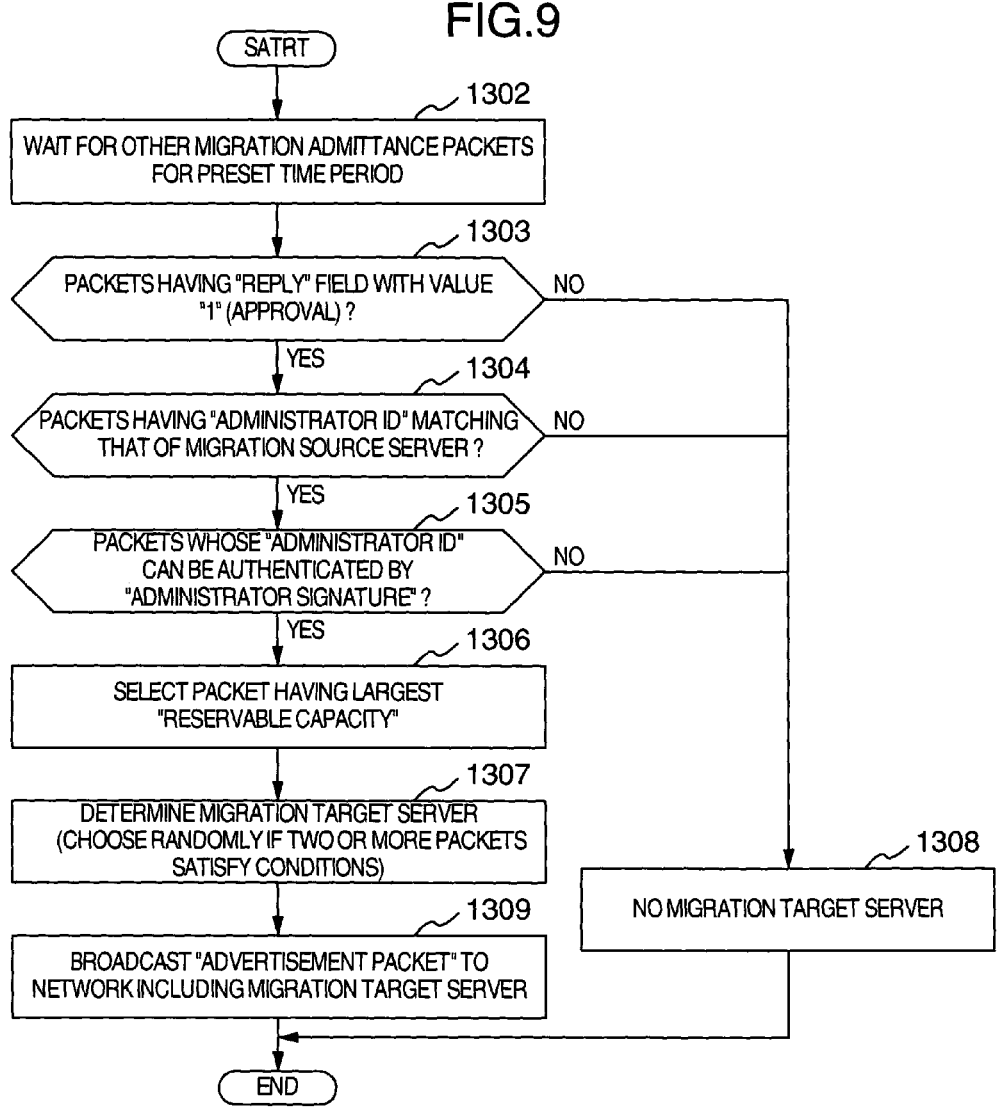

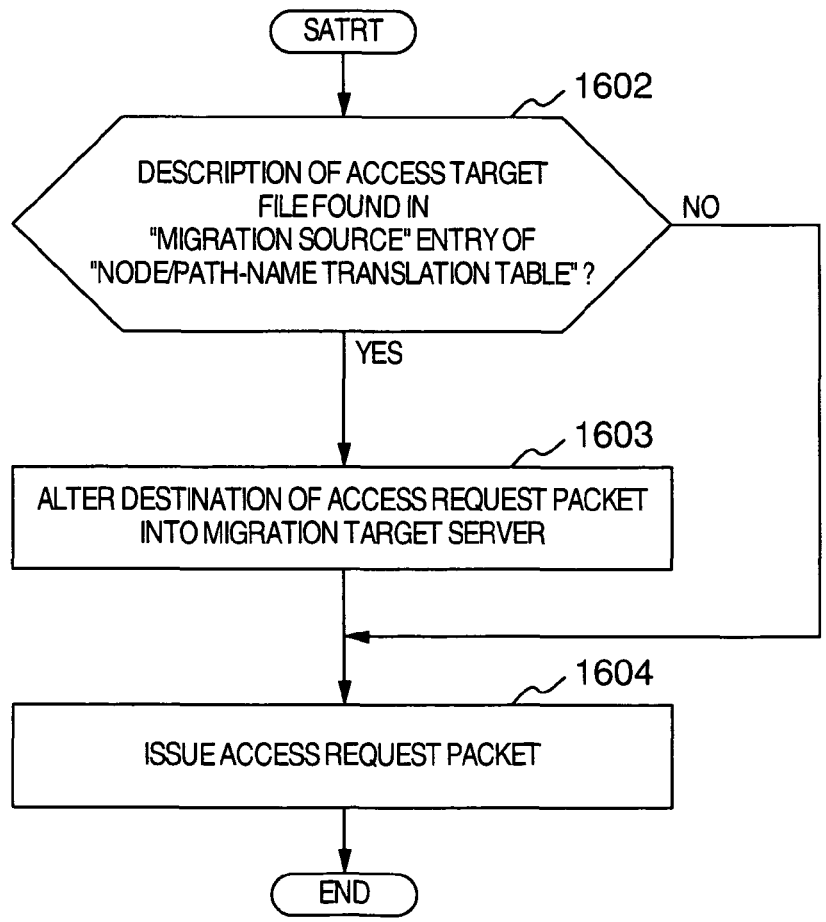

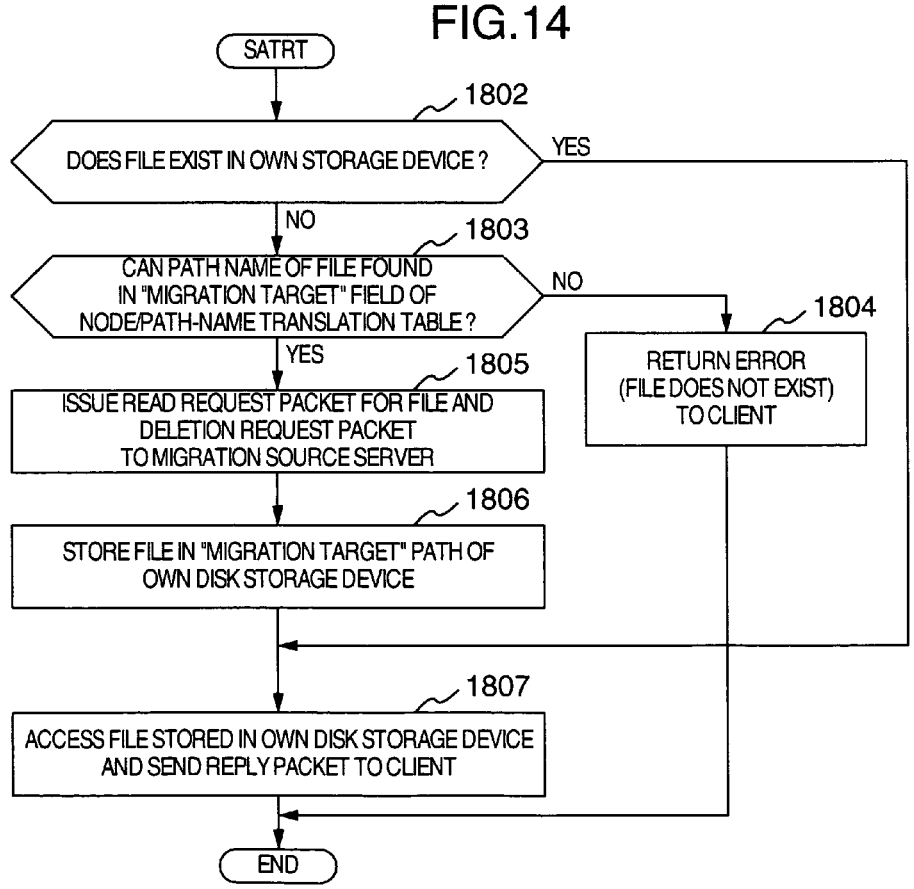

REQUEST PACKET (BEFORE ALTERATION)

| | |
|---|---|
| TARGET | 200.0.0.101 |
| SOURCE | 200.0.0.1 |
| REQUEST TYPE | read |
| REQUEST PATH NAME | /doc/misc/record.out |
| OFFSET [byte] | 4096 |
| SIZE [byte] | 1024 |

REQUEST PACKET (AFTER ALTERATION)

| | |
|---|---|
| TARGET | 100.0.0.101 |
| SOURCE | 200.0.0.101 |
| REQUEST TYPE | read |
| REQUEST PATH NAME | /200.0.0.101/doc/misc/record.out |
| OFFSET [byte] | 4096 |
| SIZE [byte] | 1024 |

FIG.17A

REPLY PACKET
(BEFORE ALTERATION)

| | |
|---|---|
| TARGET | 200.0.0.101 |
| SOURCE | 100.0.0.101 |
| REQUEST TYPE | read |
| REQUEST PATH NAME | /200.0.0.101/doc/misc/record.out |
| OFFSET [byte] | 4096 |
| SIZE [byte] | 1024 |
| DATA | DATA |

FIG.17B

REPLY PACKET
(AFTER ALTERATION)

| | |
|---|---|
| TARGET | 200.0.0.1 |
| SOURCE | 200.0.0.101 |
| REQUEST TYPE | read |
| REQUEST PATH NAME | /doc/misc/record.out |
| OFFSET [byte] | 4096 |
| SIZE [byte] | 1024 |
| DATA | DATA |

FIG.18

| ACCESSED FILE PATH | REQUESTER NETWORK | DISTANCE | NUMBER OF ACCESS | ACCESS START TIME |
|---|---|---|---|---|
| /200.0.0.101/doc/misc/record.out | 100.0.0.0/24 | 5 | 200 | 2002/10/1 18:00:00 |
| | | | | |
| | | | | |

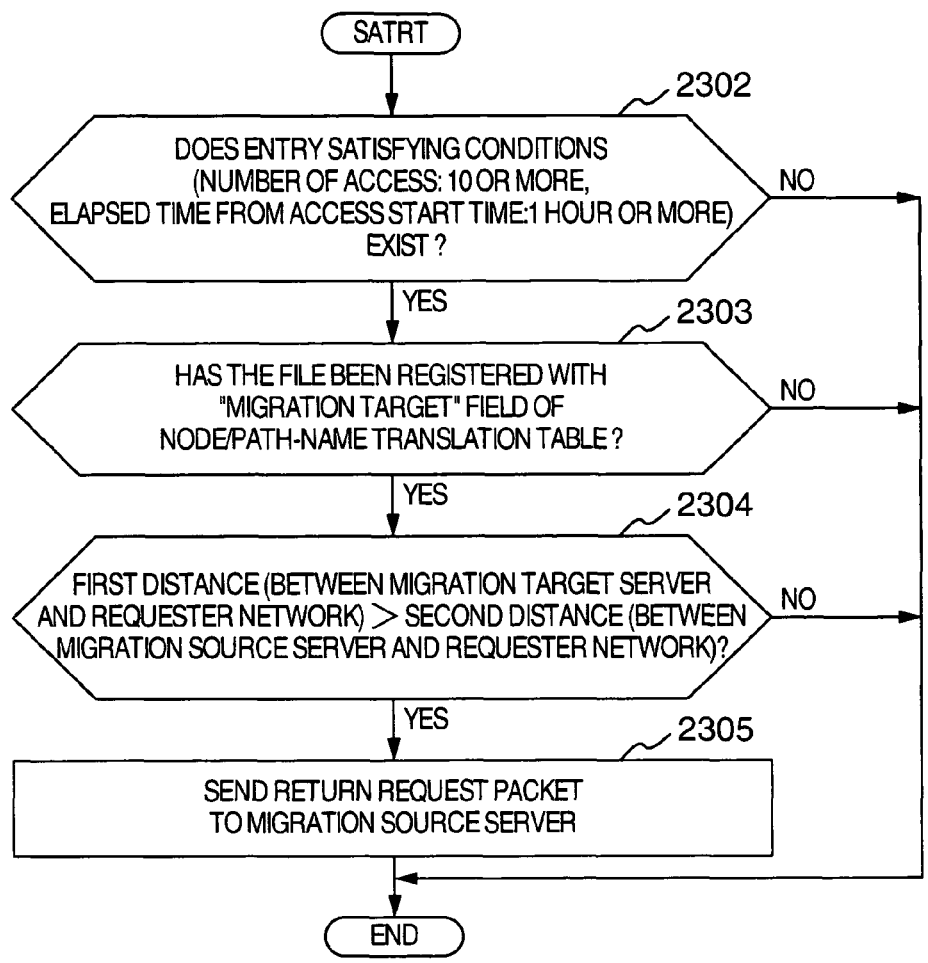

FIG.23

| ACCESSED FILE PATH | REQUESTER NETWORK | DISTANCE | NUMBER OF ACCESS | ACCESS START TIME |
|---|---|---|---|---|
| /doc/misc/record.out | 100.0.0.0/24 | 5 | 120 | 2002/9/1 10:00:00 |
| /doc/misc/sample.log | 100.0.0.0/24 | 5 | 105 | 2002/9/2 10:00:04 |
| /doc/memo.txt | 200.0.0.0/24 | 1 | 45 | 2002/9/2 10:00:30 |
| /doc/misc/work/tmp.txt | 100.0.0.0/24 | 5 | 40 | 2002/9/1 10:00:04 |
|  |  |  |  |  |

FILE MIGRATION DEVICE

BACKGROUND OF THE INVENTION

The present invention relates to a technique employed by a computer of a system including a plurality of computers connected by a network (hereafter, referred to as "network system") for making access via the network to data stored in a storage device connected to another computer.

As a technique for allowing a client to access a file managed by a file server via a network, there is a method called NFS (Network File System). Incidentally, in the following description, a computer that requests access (read, write) to a file stored in a storage device of another computer will be referred to as "client computer" (or simply as "client"), and a computer that accesses the file of its storage device in response to the request by the client and sends the result of access (read data, whether data write was conducted successfully or not, etc.) back to the client will be referred to as "file server computer" (or simply as "file server" or "server"). A "file" means a group of data used by an application program executed by a computer and user.

In NFS, a client requests access to a server by sending an RPC (Remote Procedure Call) request message packet to the server. The server responds to the request of the client by returning an RPC reply message packet.

Since the protocol design of NFS is basically founded on a "stateless" principle (holding no status information in the server or client), the client does not temporarily store (cache) the file read out from the server in its storage device. Therefore, communication between the client and the server necessarily takes place when the client makes access to a file managed by the server.

Meanwhile, the so-called DFS (Distributed File System) and proxy servers are known as techniques for caching the files (managed by the file server) in the client itself or in a server in the proximity of the client.

In DFS, the client caches data of files read out from the server in a storage device of the client itself.

In contrast, a proxy server is placed between the client and the server (mostly on a network including the client). For requesting access to a file of the server, the client sends an access request to the proxy server. The proxy server reads the file from the server on behalf of the client and sends the file to the client, while caching the acquired file in itself.

Thereafter, when an access request for the same file is sent from the client to the proxy server, the proxy server sends the cached file to the client, without making access to the server.

There has been disclosed a system comprising a main file server and an auxiliary file server in JP-A-6-243074 in which when the main file server ran short of free space or storage capacity, files stored in the main file server are transferred to the auxiliary file server (migration of files). When an access request for the transferred file is made by a client, the main file server requests the auxiliary file server to return the requested file to the main file server.

SUMMARY OF THE INVENTION

In NFS, when the client makes access to a file managed by a server, there necessarily occurs the go and return communication of the request/reply packets between the client and server since the client does not cache the files of the server. Thus, when the client accesses a file being managed by a distant file server, delay time (latency) for the packet transmission from the server to the client gets long and the response of the client to the user is necessitated to be slow.

Meanwhile, it is possible to avoid the increase of latency till the arrival of packet by caching files in the client itself or in a nearby server as in the cases of DFS and proxy servers. However, the "cache method" involves the following problems.

In the cache method, in addition to files (original files) stored in the server, a plurality of copies of the original files are generated in the clients. Thus, it becomes necessary to synchronize data on both sides (server and client), that is, to maintain the identity of data on both sides (consistency control process). Especially, the consistency control process takes longer time as the distance between a computer storing the original and a computer storing the copy gets longer. Further, in cases where the files are updated frequently by the client, the consistency control process is also required frequently and the effect of the cache method, suppressing the increase of latency, is spoiled.

Meanwhile, the proxy servers do not carry out the consistency control process. Thus, when a file of the latest version is necessary, the client has to send a file access request to the proxy server again, by which the increase of latency can not be suppressed.

The "migration method" disclosed in JP-A-6-243074 does not need the consistency control. However, since transferring a file (migration of the file) changes the stored location of the file, the performance of the network system gets worse if the accessibility of the client to the file after migration is worse than that before migration. The improvement of accessibility is not taken into consideration in JP-A-6-243074 aiming principally to relieve the shortage of storage capacity of the file server. Thus, the possibility of the increase of latency due to the increase of the distance between the client and server (with the distance between the client and the auxiliary file server longer than that between the client and the main file server) is not considered in JP-A-6-243074.

It is especially important that the way of file transfer or migration (whether or not a file frequently accessed by many clients should be transferred to another server, to which server the frequently accessed file should be transferred, etc.) be determined based on the distribution of probable clients (having a possibility of accessing the file) in the network. However, such an important point is not taken into account in conventional techniques.

In order to resolve the above problems, in a system according to the present invention, a first server (having a disk storage device storing a file being accessed by a client) checks location information of a network including the client and determines candidate servers for the destination of the file transfer or migration. The first server transmits a migrator acceptor search packet to unspecified number of servers on the network including the client (or on networks in the proximity of the network including the client) in order to search for the acceptor of the file. A second server which received the migrator acceptor search packet transmits a migration admittance packet (indicating acceptability of the file) to the first server. The first server checks the contents of the migration admittance packet and if the second server is found to be suitable for the migration, transfers the file to the second server.

The first server further transmits an advertisement packet (indicating the migration of the file) to the network including the client accessing the file (or to networks in the proximity of the network). Thereafter, the client makes access to the transferred file by accessing the second server.

BRIEF DESCRIPTION OF THE DRAWINGS

The objects and features of the present invention will become more apparent from the consideration of the following detailed description taken in conjunction with the accompanying drawings, in which:

FIGS. 2A through 2D are schematic diagrams showing examples of access request packets and reply packets;

FIG. 5 is a flow chart showing an example of a process for determining a candidate for a migration file;

FIG. 6 is a schematic diagram showing an example of a migrator acceptor search packet;

FIG. 7 is a flow chart showing an example of a migration acceptability judgment process;

FIGS. 8A and 8B are schematic diagrams showing examples of migration admittance packets;

FIG. 9 is a flow chart showing an example of a process for determining a migration target server;

FIG. 10 is a schematic diagram showing an example of a node/path-name translation table;

FIG. 11 is a schematic diagram showing an example of an advertisement packet;

FIG. 12 is a flow chart showing an example of an access alteration process;

FIG. 13A, 13B are schematic diagrams showing examples of access request packets before and after alteration;

FIG. 14 is a flow chart showing an example of a process conducted by the migration target server;

FIG. 17A, 17B are schematic diagrams showing an example of alteration of a reply packet conducted by the migration source server;

FIG. 18 is a schematic diagram showing an example of an access statistics table;

FIG. 19 is a flow chart showing an example of a process for selecting a file to be returned to the migration source server;

FIG. 20 is a schematic diagram showing an example of a return request packet;

FIG. 23 is a schematic diagram showing an example of an access statistics table;

DESCRIPTION OF THE EMBODIMENTS

Figure 1:
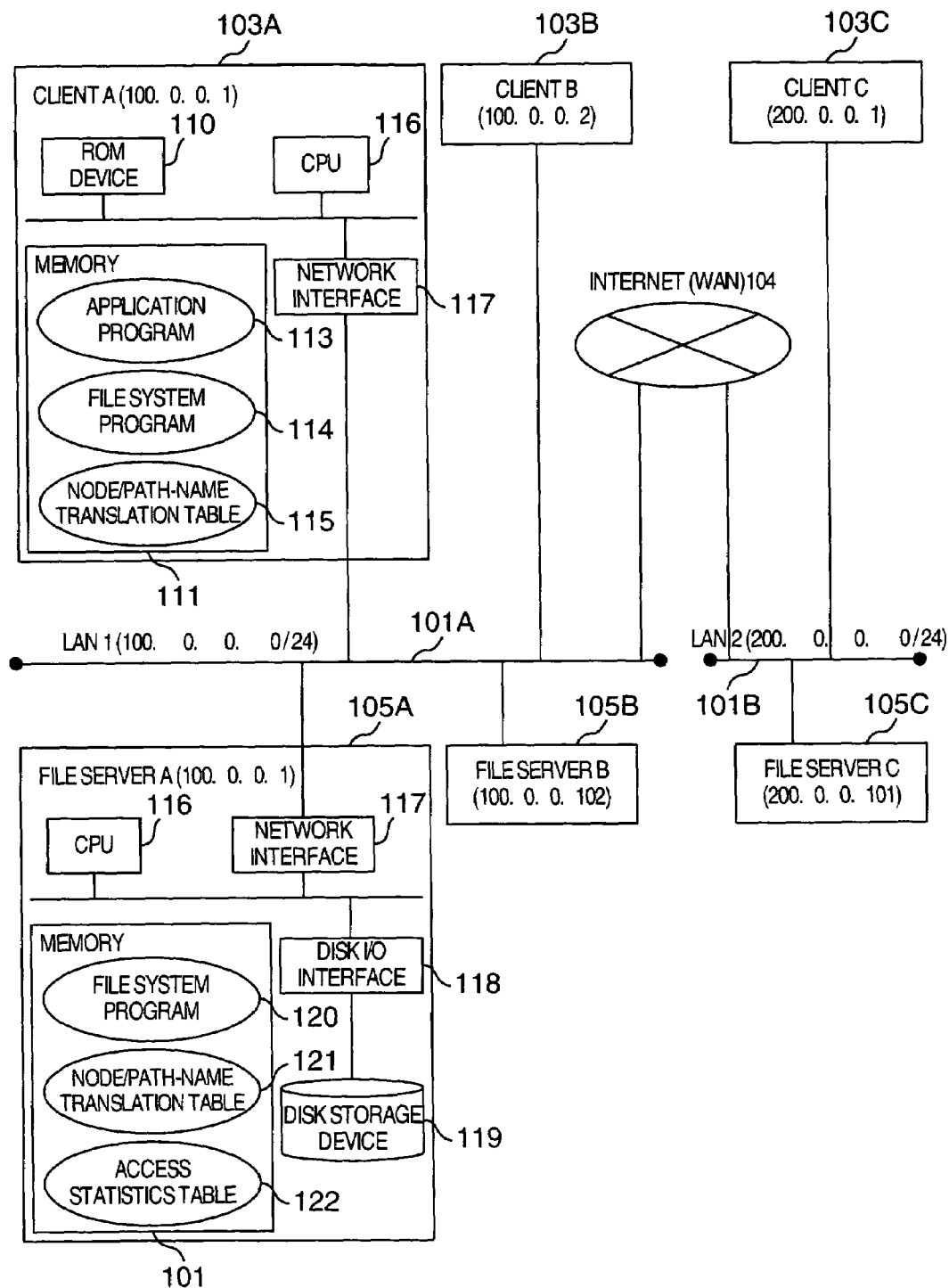
FIG. 1 is a block diagram showing a network system in accordance with a first embodiment of the present invention.

Referring now to the drawings, a description will be given in detail of preferred embodiments in accordance with the present invention.

FIG. 1 is a block diagram showing a network system in accordance with a first embodiment of the present invention. The network system comprises three file servers 105 (105A, 105B, 105C) and three clients 103 (103A, 103B, 103C). The file servers 105A and 105B and the clients 103A and 103B are connected together by lines 101A. The lines 101A are implemented by a LAN (Local Area Network) in the example of FIG. 1 (here-after, referred to as "LAN1"). The file server 105C and the client 103C are connected together by a LAN 101B (hereafter, referred to as "LAN2").

In this example, the LAN1 and LAN2 are connected by a WAN (Wide Area Network) 104 such as the Internet, in which the LAN1 and LAN2 are assigned network masks 100.0.0.0/24 and 200.0.0.0/24 respectively. While the lines 101 are implemented by LANs in the example of FIG. 1, it is of course possible to employ other types of lines.

In this specification, address notation employed in IPv4 (Internet Protocol version 4) is used for the description of the network masks, etc. Each device (computer, etc.) connected to the network of the embodiment is assigned a 32-bit IP address (e.g. "100.0.0.1") that is unique to the device. The notation of the network mask (e.g. "100.0.0.0/24" assigned to the LAN1) indicates that computers connected to the LAN1 are assigned IP addresses having common upper 24 bits, that is, each computer connected to the LAN1 is assigned an IP address selected from "100.0.0.0"-"100.0.0.255". Therefore, the devices connected to the LAN1 are identified as elements of a group (hereafter, referred to as "network group") based on the network mask assigned to the LAN1.

Each file server 105 is a computer including a CPU 116, a memory 101, a network interface 117, a disk I/O interface 118, and a disk storage device 119. The CPU 116, memory 101, network interface 117 and disk I/O interface 118 are connected together by a bus. The disk storage device 119 is connected to the CPU 116 etc. via the disk I/O interface 118. The file server 105 is connected to a corresponding LAN 1 via the network interface 117.

Incidentally, the file server 105 does not necessarily have to include the disk storage device 119 installed therein. In such cases, the file server 105 is equipped with a network interface instead of the disk I/O interface 118 and is connected to a storage system of another box via the network interface and a network. A protocol such as the fiber channel protocol is employed in the network interface and the network. The file server 105 can also be implemented by a NAS (Network Attached Storage) specifically designed for file system functions.

It is also possible to provide the file server 105 with both a disk storage device 119 and a network interface for the connection with a storage system of another box.

The above term "storage system" means a storage device including a storage medium and a controller. The storage medium is implemented by a magnetic disk, optical disk, etc. The storage system can also mean a disk array having redundant composition. The disk storage device 119 installed in the file server 105 can be a single hard disk drive, a disk array, a DVD drive, etc.

The memory 101 stores a file system program 120, a node/path-name translation table 121 and an access statistics table 122. Such table information and programs are circled in FIG. 1. When the power is off, the programs and tables are stored in a nonvolatile memory unit (disk storage device 119, ROM, etc.) of the file server 105. In order to use the tables and programs, the file server 105 reads them out of the nonvolatile memory unit and writes them in the memory 101. The programs such as the file system program 120 may be installed in the disk storage device 119 or the memory 101 of the file server 105 via a record medium (floppy disk, DVD, etc.), a line (network, etc.), radio communication, etc.

The CPU 116 executes the file system program 120 and thereby carries out: packet communication with other file servers 105 etc. connected to the LAN 101; access to the disk storage device 119; update of data stored in the memory 101; etc.

Similarly to the file servers 105, each client 103 is a computer including a CPU 116, a memory 111 and a network interface 117. In this embodiment, the client 103 includes a ROM device 110 instead of the disk storage device 119. The client 103 can also be implemented by the same composition as the file server 105. The client 103 is connected to the LAN 101 via a network interface 117.

The memory 111 of the client 103 stores an application program 113, a file system program 114 and a node/path-name translation table 115. When the power is off, the programs etc. are stored in the ROM device 110.

The CPU 116 of the client 103 executes the file system program 114 and thereby makes access to a file stored in the disk storage device 119 of a file server 105 via the LAN 101. The CPU 116 of the client 103 also executes the application program 113 and thereby provides services requested by the user of the client.

The file system implemented by the file system programs 114 and 120 of this embodiment is a hierarchical file system which manages files under logical tree structure, as those employed in commonly used OS's (Operation Systems) such as UNIX. Specifically, data structure having a root directory placed on top of the tree and having zero or more files and/or directories under each directory is employed. In this embodiment, each file managed by the file system is expressed by a character string (hereafter, referred to as "file path name") including a sequence of directory names and a file name separated by separators or delimiters "/", like "/doe/misc/readme.txt".

FIGS. 2A through 2D are schematic diagrams showing examples of access request packets and reply packets communicated between the client 103 and the file server 105 of this embodiment. The communication via the LAN 101 is carried out by means of data transmission/reception of packets according to a prescribed communications protocol. The client 103 sends a read/write request packet (shown in FIGS. 2A and 2B) to the file server 105. The file server 105 which received the read/write request packet sends a read/write reply packet (shown in C and D of FIG. 2) back to the client 103.

FIG. 2A shows a packet which is sent from a client A (source field: 100.0.0.1 (IP address of the client A)) to a file server C (target field: 200.0.0.101) as a read request (request type) for a 1024-byte part (size) of a file "/doc/misc/sample.log" (request path name) starting at 4096 bytes (offset) from the front end of the file.

FIG. 2B shows a packet which is sent from the client A (source) to the file server C (target) as a write request (request type) for writing data (stored in a "data" field of the packet) to a 1024-byte part (size) of a file "/doc/misc/sample.log" (request path name) starting at 4096 bytes (offset) from the front end of the file.

FIG. 2C shows a packet which is sent from the file server C (source) back to the client A (target) as a read reply (request type). The 1024-byte part (size) of the file "/doc/misc/sample.log" (request path name) starting at 4096 bytes (offset) from the front end of the file is stored in a "data" field of the packet as the reply.

FIG. 2D shows a packet which is sent from the file server C (source) back to the client A (target) as a write reply (request type). The packet indicates that the data write to the 1024-byte part (size) of the file "/doc/misc/sample.log" (request path name) starting at 4096 bytes (offset) from the front end of the file has been completed normally.

The CPU 116 of each file server 105 monitors accesses made by the clients 103 by executing the file system program 120 and stores results of monitoring in the access statistics table 122.

Figures 3, 4:
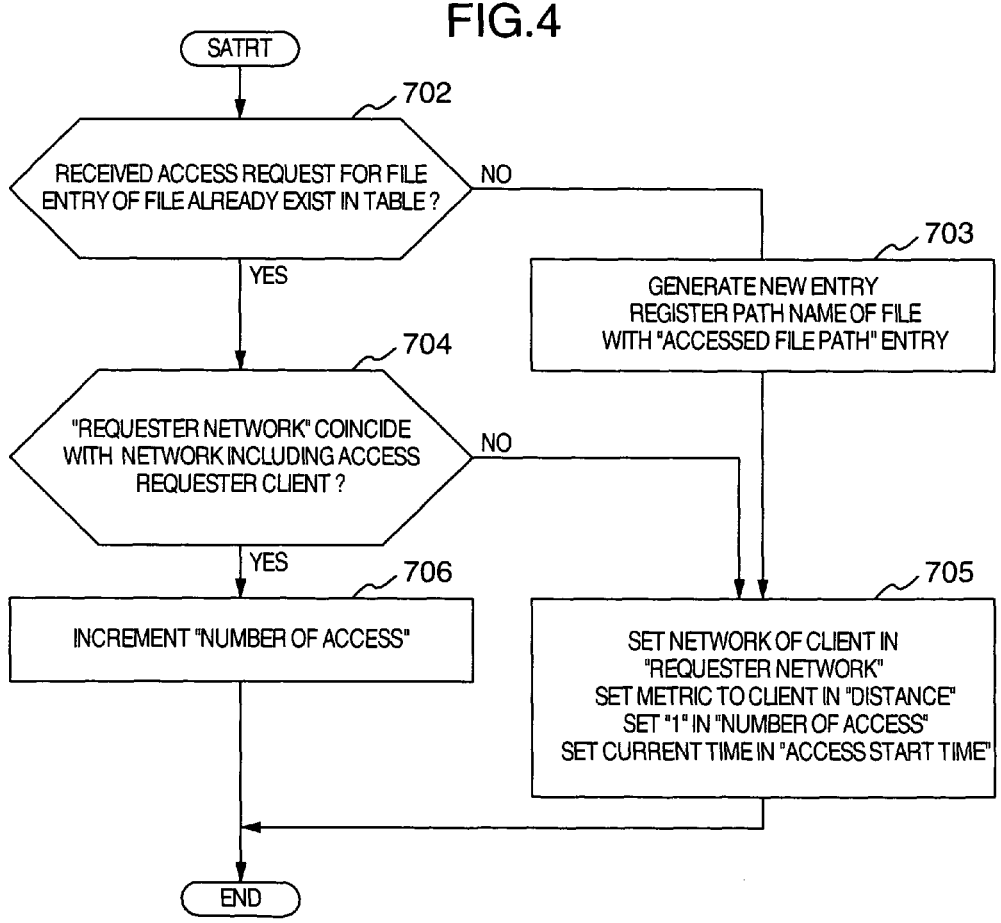
FIG. 3 is a schematic diagram showing an example of an access statistics table.
FIG. 4 is a flow chart showing an example of a process for updating the access statistics table.

FIG. 3 is a schematic diagram showing an example of the access statistics table 122. The access statistics table 122 includes: an entry 601 for registering a path name of a file accessed by a client 103; an entry 602 for registering a network mask that is common to a network group including the client 103 as the requester; an entry 603 for registering a distance to the network (not the physical distance but a distance calculated mainly from the hop number (the number of intermediate routers), delay time, communication fee, reliability, etc.); an entry 604 for registering the number of accesses made by clients 103 of the network group; and an entry 605 for registering the time of the first access from a client 103 of the network group. The above information is stored in the access statistics table 122 for each file.

To explain here briefly the outline of a procedure according to the present invention, a file server checks the access statistics table, finds out a file to be transferred (target of migration), determines a file server as the destination of the file, alters information on the stored location of the file, and transfers the file. Each step of the procedure will be explained below.

FIG. 4 is a flow chart showing a process for updating the access statistics table 122 which is conducted by the file server 105. The process of FIG. 4 is carried out when the file server 105 received a file access request from a client 103.

On receiving the access request for a file, the server 105 checks the access statistics table 122 stored in its memory 101 and determines whether or not the table already includes an entry of the file designated by the access request (step 702).

If there is no entry of the file designated by the access request (NO in the step 702), the server 105 generates a new entry in the access statistics table 122 and registers the path name of the file with the "accessed file path" entry 601 (step 703).

If there already exists an entry of the file designated by the access request (YES in the step 702), the server 105 checks whether or not a network 101 corresponding to the network mask registered with the "requester network" entry 602 regarding the designated file coincides with a network 101 as a network group including the client 103 that requested the file access. Specifically, the most significant 24 bits (24: an example of the mask bit length) of the address stored in the target (server) field of the access request packet is compared with the network mask registered with the "requester network" entry 602 (step 704).

If the network 101 as the network group including the access requester client 103 is different from the network 101 corresponding to the registered network mask (NO is the step 704) or if a new file entry has been generated in the step 703, the server 105 registers the network mask of the network group including the client 103 with a "requester network" entry 602 corresponding to the file (target of the access request). The server 105 also registers the distance between the network group including the client 103 and the network group including the server 105 with a "distance" entry 603 corresponding to the file. In this example, the number of intermediate routers (intermediating between networks) existing between the network group including the client 103 and the network group including the server 105 is registered as the distance. Taking the Internet as an example, the distance between devices (hop number) can be obtained by use of an ICMP packet, etc.

Further, the server 105 sets a value "1" in a "number of access" entry 604 corresponding to the file (target of access) and sets the current time (time when the value is set in the table) in an "access start time" entry 605 corresponding to the file (step 705).

If the network group including the access requester client 103 is judged to be the same as the network group registered with the access statistics table 122 (YES in the step 704), the server 105 increments the value of the "number of access" entry 604 corresponding to the accessed file by 1 (step 706). After executing the step 705 or 706, the server 105 ends the access statistics table update process.

For example, assuming that the current time is 0.300 sec after "2002/9/1 10:00:00", the first line of the access statistics table 122 of FIG. 3 indicates that there occurred 120 consecutive accesses to a file "/doc/misc/record.out" of the file server 105 from a client 103 (with a distance 5 from the server 105) of the network group of the LAN1 (100.0.0.0/24) during the 0.300 sec period (current time minus access start time).

Here, suppose the client 103C issued a read request for a file "/doc/misc/record.out" of the file server 105C, the first line of the access statistics table 122 of FIG. 3 is updated to "/doc/misc/record.out", "200.0.0.0/24", "1", "1", "(current time)" by the process of FIG. 4 since the network group (LAN2) including the client 103C differs from the previously registered network group (LAN1).

Each file server 105 checks the contents of its access statistics table 122 at certain periods and determines whether or not there exists frequent access (described in detail later) to a file (managed by the file server 105) from clients 103 of a particular network group (hereafter, expressed as "access from a network group"). If such a file is found, the file server 105 designates the file as a candidate for the migration.

FIG. 5 is a flow chart showing an example of a process conducted by the server 105 for selecting the migration candidate file. The process is carried out by the file server 105 at preset periods by executing the file system program 120.

The file server 105C executing the file system program 120 checks the access statistics table 122 and judges whether there exists a file satisfying predetermined conditions (step 802). In this embodiment, the conditions for the migration candidate includes:

A. The distance between a network group including the client 103 and a network group including the file server 105 is 2 or more;
B. The number of accesses from a network group is 10 or more; and
C. The time difference between the access start time and the current time is 1 hour or more (that is, no access from other network groups occurred during the period).

The above thresholds, preliminarily set in the file system program, can also be altered by the user.

If there is a file satisfying the conditions (YES in the step 802), the file server 105C designates the file as the migration candidate. For example, if the current time is "2002/9/2 11:00:05" (Sep. 2, 2002 11:00:05), the file "/doc/misc/record.out" in the access statistics table 122 of FIG. 3 fulfills the conditions and thus the file is selected as the migration candidate (step 803).

Once the migration candidate file is selected, the file server 105C tries to transfer the file to a file server 105 of the network group frequently accessing the file. In the above example, the file server 105C searches for a file server (105A or 105B) from the network group (LAN1 in this example) accessing the selected file "/doc/misc/record.out". Concretely, the file server 105C broadcasts a migrator acceptor search packet to devices that are connected to the LAN1. Here, the "broadcast" means packet transmission designating any (unspecified) device (nodes) of a specified network as the receiver (step 804).

FIG. 6 is a schematic diagram showing an example of the migrator acceptor search packet. The file server 105C which transfers the file (hereafter, referred to as "migration source server") issues the migrator acceptor search packet in order to judge whether the file can be transferred to a file server (105A or 105B) of a specified network group, that is, in order to search for a file server 105A or 105B to accept the file (hereafter, referred to as "migration target server").

Referring to FIG. 6, the "target network" field of the migrator acceptor search packet stores a network mask designating the target of the broadcast of the migrator acceptor search packet. The "source server" field stores the IP address of the node (server) issuing the packet. The "migration ID" is an identification number assigned by the migration source server in order to discriminate the particular migration process from other migration processes. The "migration source server" indicates the IP address of the migration source server.

The migrator acceptor search packet has a "request capacity" field, which stores a storage capacity to be reserved in the migration target server 105A or 105B for storing the file (hereafter, referred to as "migration file") transferred from the migration source server. Specifically, the storage capacity stored in the field is set equal to the size of the migration file or greater than the size in expectation of an increase in the file size.

Each file server (105A, 105B) of the LAN1 network group receives the migrator acceptor search packet and judges whether it can accept the designated migration file and sends the result of judgment to the migration source server.

FIG. 7 is a flow chart showing the migration acceptability judgment process conducted by each server (105A, 105B) receiving the migrator acceptor search packet. The process is carried out by the servers 105A and 105B by executing the file system program 120.

Each file server (105A, 105B) which received the migrator acceptor search packet generates a migration admittance packet. FIGS. 8A and 8B are schematic diagrams showing concrete examples of the migration admittance packet. The file server (105A, 105B) sets an administrator ID ("foo" in this example) of an administrator of the server in an "administrator ID" field of the migration admittance packet. Further, in order to prevent spoofing and ensure the authenticity of the administrator, the file server 105 also sets an encrypted administrator signature ("oekdigke" in his example) in an "administrator signature" field (step 1002).

Subsequently, the file server (105A, 105B) checks free space of its disk storage device 119 to judge the acceptability of the migration file. The file server (105A, 105B) judges the migration file acceptable if the disk storage device 119 has free space larger than or equal to the request capacity designated by the migrator acceptor search packet. If the free space is smaller than the request capacity, the file server (105A, 105B) judges the migration file not acceptable (step 1003).

If the migration file is acceptable, the file server (105A, 105B) sets a value indicating approval of acceptance ("1" in this example) in a "reply" field of the migration admittance packet, while setting a value indicating the free space of the disk storage device 119 in a "reservable capacity" field of the migration admittance packet. The file server (105A, 105B) generates a directory for accepting the migration file ("/200.0.0.101/" in this example) in its disk storage device 119 and sets information on the path name of the generated directory in a "migration target path name" field of the migration admittance packet (step 1004).

If the migration file is not acceptable, the file server (105A, 105B) sets a value indicating disapproval of acceptance ("0" in this example) in the reply field of the migration admittance packet (step 1005).

In this embodiment, the file servers 105A and 105B of the LAN1 network group, as candidates for the migration target server, are assumed to send back the migration admittance packets of FIGS. 8A and 8B respectively to the migration source server 105C.

The file server 105C which received the migration admittance packets from the file servers 105A and 105B compares the contents of the packets and determines the migration target server.

FIG. 9 is a flow chart showing a process conducted by a migration source server (105C in this example) for determining the migration target server. The process is carried out by the migration source server 105C after receiving the migration admittance packets, by executing the file system program 120.

The file server 105C which received a migration admittance packet waits for the arrival of other migration admittance packets for a preset time period (step 1302). In cases where no migration admittance packet arrives after the broadcast of the migrator acceptor search packet, the file server 105C judges that there exists no acceptor (migration target) and conducts no more process. Migration admittance packets arriving after the expiration of the preset time period are ignored. Out of the migration admittance packets arriving within the preset time period, the file server 105C selects ones having the reply field with the value "1" (approval) (step 1303).

Out of the selected migration admittance packets, the file server 105C further selects ones whose administrator ID (stored in the administrator ID field) is the same as that of an administrator of the file server 105C itself and whose administrator ID can be authenticated by the encrypted signature stored in the administrator signature field. Incidentally, if the administrator of the file server 105 (105A, 105B) sending the migration admittance packet is different from that of the migration source server 105C, the file server 105 may be regarded as unreliable and can be excluded from the candidates for the migration target server. Even when the administrator is different, it is also possible to let the migration source server designate the file server 105 as the migration target server and transfer the file to the server when the administrator registered with the migration admittance packet matches one of authorized administrators which have preliminarily been registered with the migration source server (steps 1304, 1305).

Thereafter, out of the selected migration admittance packets, the file server 105C selects one having the largest storage capacity designated in the reservable capacity field (step 1306). In this example, the file server 105C selects the migration admittance packet of FIG. 8A having larger reservable capacity and thereby selects the file server 105A (which issued the selected packet) as the migration target server. If two or more migration admittance packets satisfy the condition of the step 1306, the file server 105C randomly chooses one of them (step 1307).

If no migration admittance packet fulfills the conditions of the above steps, the file server 105C judges that there exists no migration target server and does not conduct a migration target server designation process which will be described below, that is, the file server 105C does not transfer the file (step 1308).

The migration source server 105C which determined the migration target server updates the node/path-name translation table 121 by executing the file system program 120. By the update, the file server managing the migration file is changed from the migration source server 105C to the migration target server 105A.

FIG. 10 is a schematic diagram showing an example of the node/path-name translation table 121. In the table 121, data concerning the migration source server and the migration target server of each migration file are registered being associated with one another. The file server 105 can learn from the table whether files has been transferred or not and where transferred files exist.

After determining the migration target server, the migration source server 105C adds a new entry (line) for the migration target server to the node/path-name translation table 121 and sets values in its migration source node field, migration source path name field, migration target node field and migration target path name field. The "migration ID" is an identification number which has been assigned by the migration source server in order to discriminate the particular migration process from other migration processes and which has been written in the migrator acceptor search packet by the migration source server.

In the migration source node field, the IP address ("200.0.0.101") of the migration source server (105C in this example) is set. In the migration source path name field, the path of the migration file ("/doc/misc/record.out") is set.

In the migration target node field, a value which has been stored in a migration target server field of the selected migration admittance packet ("100.0.0.101" in this example) is set. In the migration target path name field, a value which has been stored in a migration target path name field of the selected migration admittance packet ("/200.0.0.101/doc/misc/record.out" in this example) is set.

Consequently, information indicating that a file that had been managed by the file server 105C as "/doc/misc/record.out" of "200.0.0.101" has been transferred to "/200.0.0.101/doc/misc/record.out" of "100.0.0.101" is registered with the new entry of the node/path-name translation table 121.

The file server 105C which updated the node/path-name translation table 121 broadcasts an advertisement packet to the LAN1 (network group including the migration target server) in order to notify the clients 103 and file servers 105 that the file server 105A has been selected as the migration target server and the file has been transferred to the file server 105A (step 1309).

Incidentally, it does not matter whether the file has been transferred to the migration target server at the point of the broadcast of the advertisement packet. In the case where the file has not been transferred at the point of broadcast, the file transfer may be done according to a request by the migration target server when a client 103 made an access request for the migration file. By such a method, the migration can be limited to necessary cases (If no access request occurs, migration of files designated as the migration files is unnecessary.) and the increase of load on the network 101 due to the migration can be reduced to a minimum.

The actual file transfer can also be done at an arbitrary point after the broadcast of the advertisement packet, independently of the occurrence of access request (when traffic on the network 101 is light, for example). On the other hand, it is also possible to carry out the actual file transfer before the broadcast of the advertisement packet, by which the task of the migration source server at the point of access request can be reduced.

FIG. 11 is a schematic diagram showing an example of the advertisement packet. The advertisement packet of FIG. 11, containing information on the migration source server and the migration target server, indicates that a file that had been managed by the file server 105C as "/doc/misc/record.out" of "200.0.0.101" has been transferred to "/200.0.0.101/doc/misc/record.out" of the file server 105A ("100.0.0.101").

Each node (file server 105A, client 103A) which received the advertisement packet adds new a entry (line) to the node/path-name translation table (115, 121) and sets values in the migration source node field, migration source path name field, migration target node field and migration target path name field, similarly to the migration source server (105C in this example).

In the following, the operation of the client 103A for accessing the migration file will be described.

FIG. 12 is a flow chart showing an access alteration process conducted by the client 103. The process is carried out by the client 103 by executing the file system program 114. In this embodiment, a case where the client 103A makes access to the file (path name: "/doc/misc/record.out") managed by the file server 105C will be explained as an example. In this case, the application program 113 of the client 103A, having no information on the presence/absence of the migration, tries to access the file "/doc/misc/record.out" managed by the file server 105C regardless of the presence/absence of the migration.

After generating an access request packet by executing the application program 113, the client 103A refers to the node/path-name translation table 115 based on the generated access request (file "/doc/misc/record.out" managed by the file server 105C) and thereby checks whether or not a description regarding the file exists in the migration source field of the table 115 (step 1602).

If the file as the target of the access request (and the file server 105C having the file) can not be found in the migration source field of the node/path-name translation table 115 (NO in the step 1602), the client 103A directly issues the access request packet to the file server 105C (step 1604).

If the file is found in the migration source field of the table 115 (YES in the step 1602), it means that the file has already been transferred to another file server (105A) and thus the client 103A alters the destination of the access request packet into the migration target server and issues the access request packet to the migration target server. In this example, a description of the file ("/doc/misc/record.out") exists in the migration source field of the table 115, and thus the client 103A alters the target (destination) of the access request into the file server 105A (IP address: 100.0.0.101) described in the migration target field of the table 115 and issues the access request packet to the file server 105A.

FIG. 13 is a schematic diagram showing examples of the access request packet before and after the alteration. By the alteration by the client 103A, the "target (server)" field is changed to the value (100.0.0.101) that has been registered with the migration target node field of the node/path-name translation table 115, and the "request path name" field is changed to the value (/200.0.0.101/doc/misc/record.out) that has been registered with the migration target path name field of the table 115 (steps 1603, 1604).

In the following, the operation of the migration target server 105A which received the access request for the migration file will be described.

FIG. 14 is a flow chart showing a process conducted by the migration target server 105A which received the access request.

On receiving the access request packet (after the alteration which has been shown in FIG. 13), the migration target server 105A checks whether or not the file ("/200.0.0.101/doc/misc/record.out") designated by the request path name field of the access request packet has already been stored in its disk storage device 119 (step 1802).

If the file "/200.0.0.101/doc/misc/record.out" already exists in the disk storage device 119 (YES in the step 1802), it means that the file has already been transferred, therefore, the file server 105A directly accesses the file, generates a reply packet according to the access result, transmits the reply packet to the client 103A (step 1807), and ends the process.

If the file "/200.0.0.101/doc/misc/record.out" does no exist in the disk storage device 119 (NO in the step 1802), the file server 105A checks whether or not the path name of the file exists in the migration target field of the node/path-name translation table 121 (step 1803).

If the file path name can not be found in the migration target field (NO in the step 1803), it means that the file does no exist in the servers (105A, 105B, 105C) of the system, therefore, the server 105A sends an error (indicating that the file does not exist) to the client 103A (step 1804) and ends the process.

If the file path name is found in the migration target field (YES in the step 1803), it means that the file has not been transferred from the migration source server 105C to the migration target server 105A. Thus, the file server 105A obtains information on the migration source server 105C (200.0.0.101) and the path name ("/doc/misc/record.out") corresponding to the file path name by referring to the migration source field of the node/path-name translation table 121, issues a read request packet for reading the file to the migration source server 105C, and issues a request packet for requesting deletion of the migration file stored in the migration source server 105C. The migration source server 105C which received the read request packet and the deletion request packet transmits the file designated by the read request packet to the file server 105A and deletes the file from its disk storage device 119. Incidentally, if the file designated by the read request packet does not exist in the migration source server 105C, the file server 105C reports an error to the file server 105A that issued the read request packet (step 1805).

On receiving a read reply packet from the migration source server 105C, the file server 105A extracts data from the received read reply packet and stores the data in its disk storage device 119. In this case, the value which has been stored in the migration target path name field of the node/path-name translation table 121 ("/200.0.0.101/doc/misc/record.out") is used as the path name for storing the file (step 1806).

Finally, the file server 105A accesses the file "/200.0.0.101/doc/misc/record.out" stored in the disk storage device 119, sends a reply packet to the client 103A (step 1807), and ends the process.

In the following, the operation of a client 103 that did not receive the advertisement packet (e.g. client 103C) for accessing the migration file ("/doc/misc/record.out") will be described.

Since the advertisement packet is broadcast to a network 101 as a network group including an access requester client 103 satisfying specific conditions, the client 103C of another network group (e.g. LAN2) is not informed of the migration of the file (e.g. "/doc/misc/record.out" of the file server 105C) to the migration target server (e.g. file server 105A). Further, even in cases the networks 101 include a lot of clients to which the present invention is not applied, each file has to be normally accessed by all the clients.

Figures 15, 16A, 16B:
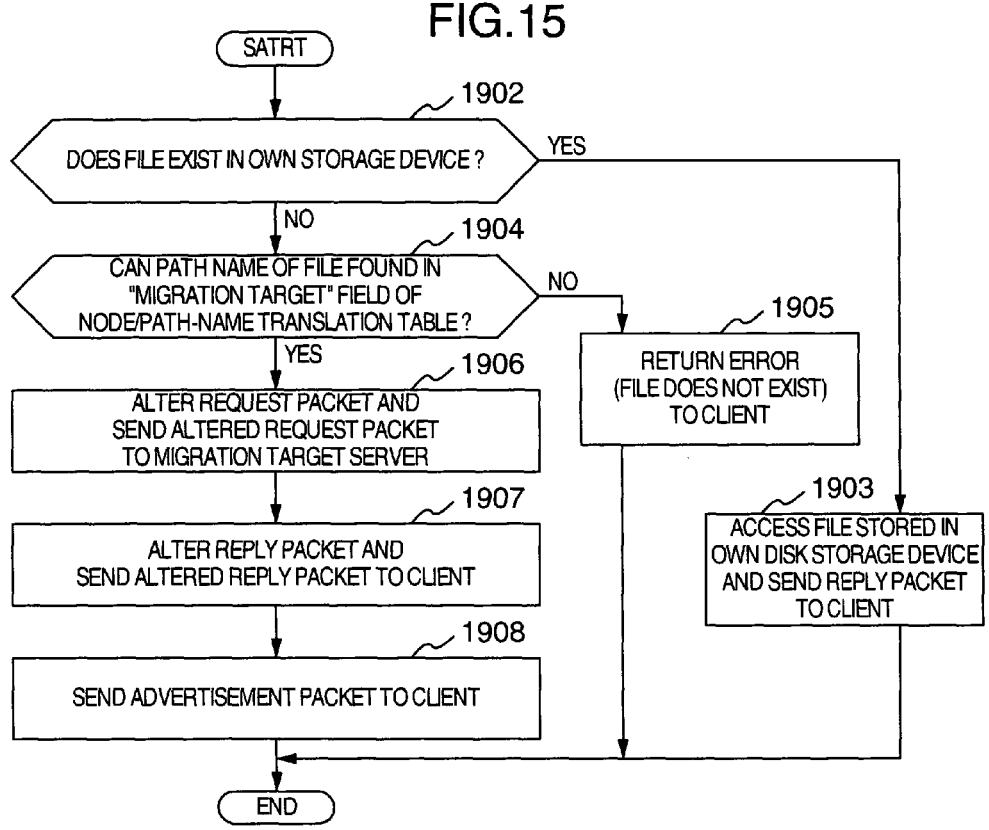
FIG. 15 is a flow chart showing an example of a process conducted by a migration source server.
FIG. 16A, 16B are schematic diagrams showing an example of alteration of a request packet conducted by the migration source server.

FIG. 15 is a flow chart showing a process conducted by the file server 105C for replying to an access request packet when the client 103C not knowing the migration issued the access request packet to the file server 105C (migration source server, in this example).

On receiving the access request packet ("before alteration" shown in FIG. 16), the file server 105C checks whether or not the file ("/doc/misc/record.out") registered with the request path name field of the access request packet exists in its disk storage device 119 (step 1902).

If the file "/doc/misc/record.out" exists in the disk storage device 119 (YES in the step 1902), the file server 105C accesses the file, generates a reply packet according to the access result, transmits the reply packet to the client 103C (step 1903), and ends the reply process.

If the file "/doc/misc/record.out" does not exist in the disk storage device 119 (NO in the step 1902), the file server 105C checks whether or not the path name of the file exists in the migration source field of the node/path-name translation table 121 (assumed to be the table 121 of FIG. 10 in this example) (step 1904). If the file path name can not be found in the migration source field (NO in the step 1904), it means that the file does no exist in the network system, therefore, the file server 105C sends an error (indicating that the file does not exist) to the client 103C (step 1905) and ends the reply process.

If the file path name is found in the migration source field (YES in the step 1904), it means that the file has already been transferred to a migration target server (file server 105A ("100.0.0.101") in the example of FIG. 10). Thus, the file server 105C refers to a migration target field of the node/path-name translation table 121 corresponding to the file path name and obtains information on the migration target server ("100.0.0.101") and the path name ("/200.0.0.101/doc/misc/record.out") in the migration target server.

Subsequently, the file server 105C alters the values of the target field and the request path name field of the access request packet supplied from the client 103C ("before alteration" shown in FIG. 16) into "100.0.0.101" (migration target server) and "/200.0.0.101/doc/misc/record.out" (path name) obtained above, and sets its own address "200.0.0.101" in the source field of the access request packet (see "after alteration" shown in FIG. 16).

Thereafter, the file server 105C transmits the altered request packet to the migration target server (105A in this example). The migration target server 105A which received the altered request packet reads out the file designated by the packet, generates a reply packet (reply packet before alteration shown in FIG. 17), and sends back the reply packet to the file server 105C (step 1906).

The file server 105C which received the reply packet from the migration target server alters: the target field (200.0.0.101) of the reply packet into the address of the client 103C which issued the read request packet (200.0.0.1); the source field (100.0.0.101) of the reply packet into the address of the file server 105C (200.0.0.101); the request path name field of the reply packet into the value which was stored in the request path name field of the request packet before alteration supplied from the client 103C ("/doc/misc/record.out") (see the reply packet after alteration of FIG. 17).

The file server 105C which completed the alteration transmits the altered reply packet to the client 103C (step 1907).

Finally, the file server 105C sends the advertisement packet to the client 103C in order to instruct the client 103C to make subsequent access requests for the file to the migration target server 105A (step 1908) and ends the reply process.

The client 103C which received the advertisement packet conducts one of the following two processes. If the client 103C can recognize the advertisement packet, the client 103C receives the advertisement packet supplied from the file server 105C and updates the node/path-name translation table 115 according to the contents of the advertisement packet. As a result, access to the file of the migration source server will thereafter be altered in the client 103C into access to the migration file (migrated file) of the migration target server, therefore, subsequent access requests for the migrated file by the client 103C will be issued directly to the migration target server.

On the other hand, if the client 103C can not recognize the advertisement packet, the advertisement packet is ignored by the client 103C. Therefore, subsequent access requests for the migrated file by the client 103C will be issued to the migration source server 105C without change. However, since the file server 105C alters the requests of the client 103C according to the above method and makes proxy access, the client 103C can still make access to the file with no need of changing its conventional method.

In the following, a method for returning the migrated file to the migration source server will be described. The distribution of clients 103 as file access requesters in the network system can change with time and there are cases where access performance can be improved by returning the migrated file (once transferred to another file server 105) to the migration source server.

Therefore, even after the file migration, each file server 105 (especially the migration target server) keeps on collecting statistical information on file access in the access statistics table 122.

The migration target server checks the access statistics table 122 (shown in FIG. 18) at preset time periods and judges whether or not the migrated file should be returned to the migration source server by the following method. Specifically, the migration target server checks whether the migrated file is frequently accessed by the network group including the migration source server.

FIG. 19 is a flow chart showing a process for selecting a migrated file to be returned to the migration source server (hereafter, referred to as "return candidate file"). The process is carried out by the migration target server at preset time periods by executing the file system program 120.

The migration target server which started the process searches the access statistics table 122 for a file satisfying specific conditions. In this example, the migration target server extracts a file that has been accessed by a particular network group only with a predetermined threshold frequency or more (e.g. 10 times or more) during a certain time period (e.g. 1-hour period till the start of the process) from the access statistics table 122. The variables such as thresholds, preliminarily set in the file system program, can also be altered by the user. Assuming that the process is started later than "2002/10/1 19:00:00", the file "/200.0.0.101/doc/misc/record.out" registered with the access statistics table 122 of FIG. 18 fulfills the above conditions (step 2302).

Subsequently, the migration target server checks whether or not the extracted file has been registered with the migration target path name field of the node/path-name translation table 121 (of FIG. 10, in this example) (step 2303).

If the extracted file has been registered with the node/path-name translation table 121 (YES in the step 2303), it means that the file is a migrated file. In this case, the migration target server compares the value of the distance field regarding the extracted file (=5) with the distance between the migration source server of the file and the network (LAN2) registered with the requester network field of the access statistics table 122 (=0: same network). The comparison allows the migration target server to judge whether or not a first distance between the network group frequently accessing the file and the network group including the migration target server is longer than a second distance between the network group frequently accessing the file and the network group including the migration source server (step 2304).

If the value of the distance field is larger, that is, if the first distance between the network group frequently accessing the migrated file and the network group including the migration target server is longer than the second distance between the network group frequently accessing the migrated file and the network group including the migration source server (YES in the step 2304), the migration target server designates the extracted file as the return candidate file, since returning the file to the migration source server reduces the accessing distance and improves the access performance of the system.

After selecting the return candidate file, the migration target server generates a return request packet. FIG. 20 shows an example of the return request packet. The migration target server sets values of fields of the return request packet by referring to corresponding entries of the node/path-name translation table 121. Thereafter, the migration target server transmits the return request packet to the migration source server (step 2305).

On the other hand, if the file does not satisfy the above conditions, the migration target server ends the process without transmitting the return request packet and conducting a file return process.

Figure 21:
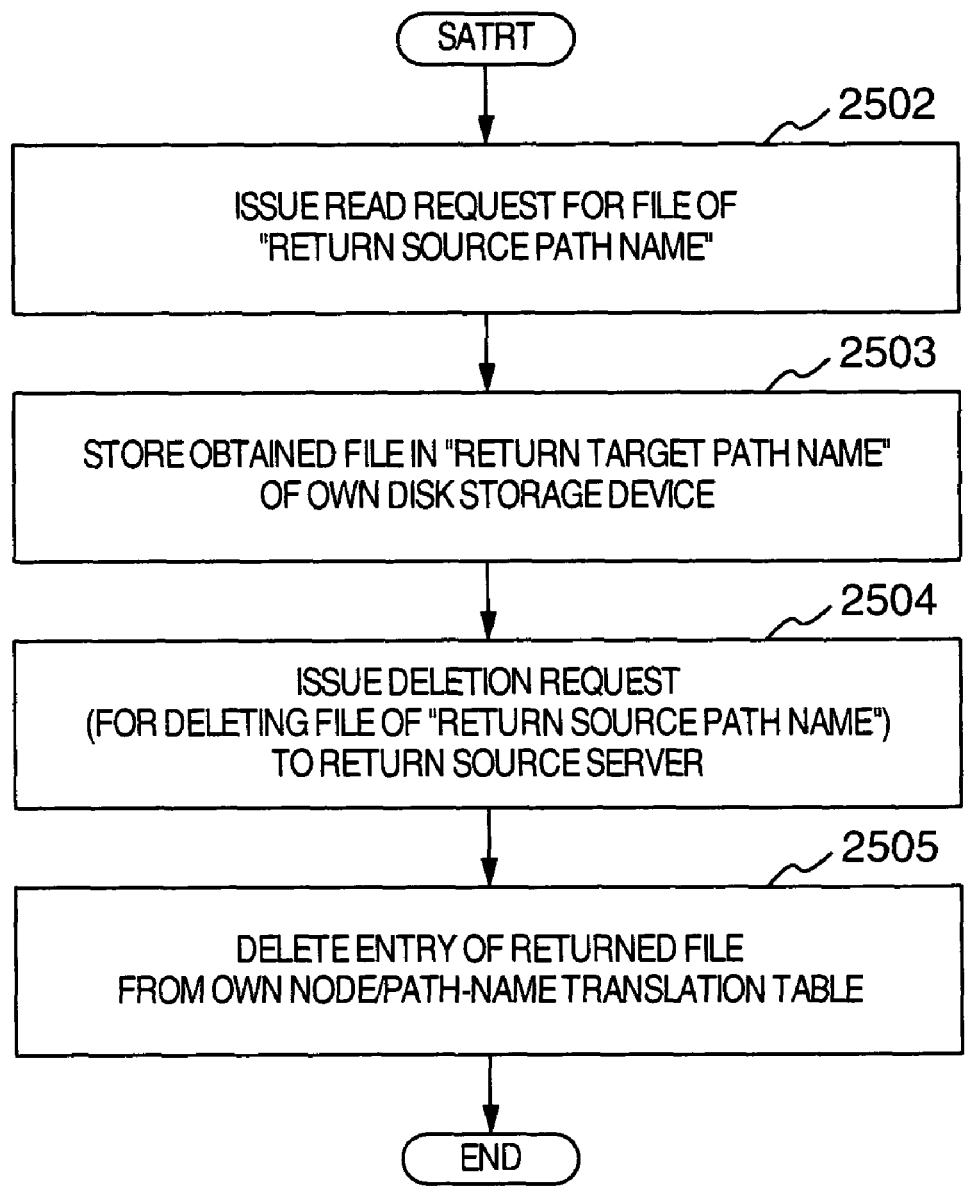
FIG. 21 is a flow chart showing an example of a file return process.

FIG. 21 is a flow chart showing the file return process for returning the return candidate file determined in the above process.

The migration source server which received the return request packet issues a read request for the file (registered with a "return source path name" field of the return request packet) to the migration target server (hereafter, also referred to as "return source server") which issued the return request packet (step 2502). The migration source server receives the file from the return source server and stores the file in its disk storage device 119 assigning a file name designated by a "return target path name" field of the return request packet (step 2503). Further, the migration source server issues a deletion request (requesting deletion of the file designated by a "return source path name" field of the return request packet) to the return source server (step 2504). Thereafter, the migration source server deletes the entry of the returned file from its node/path-name translation table 121 (step 2505) and ends the file return process.

Incidentally, in cases where a client 103 issued an access request for the file to the migration target server, the client 103 receives an error reply (indicating that the file does not exist) from the migration target server. In this case, the client 103 deletes an entry of the file (corresponding to the error reply) from its node/path-name translation table 115 and issues another access request packet to the migration source server.

In the following, a second embodiment of the present invention will be described in detail. While the file transfer was conducted in units of files in the above first embodiment, the second embodiment as a modification of the first embodiment transfers files in units of directories.

In a file system, a directory generally includes a plurality of files and the files are placed under the directory in the tree structure. In the second embodiment, all files included in a directory can be transferred to the migration target server by designating the directory as a "migration directory".

Processes conducted in the second embodiment, except the following access statistics table checking process, are basically the same as those of the first embodiment, and thus repeated description thereof is omitted for brevity. The access statistics table checking process employed in the second embodiment will be explained below.

Figure 22:
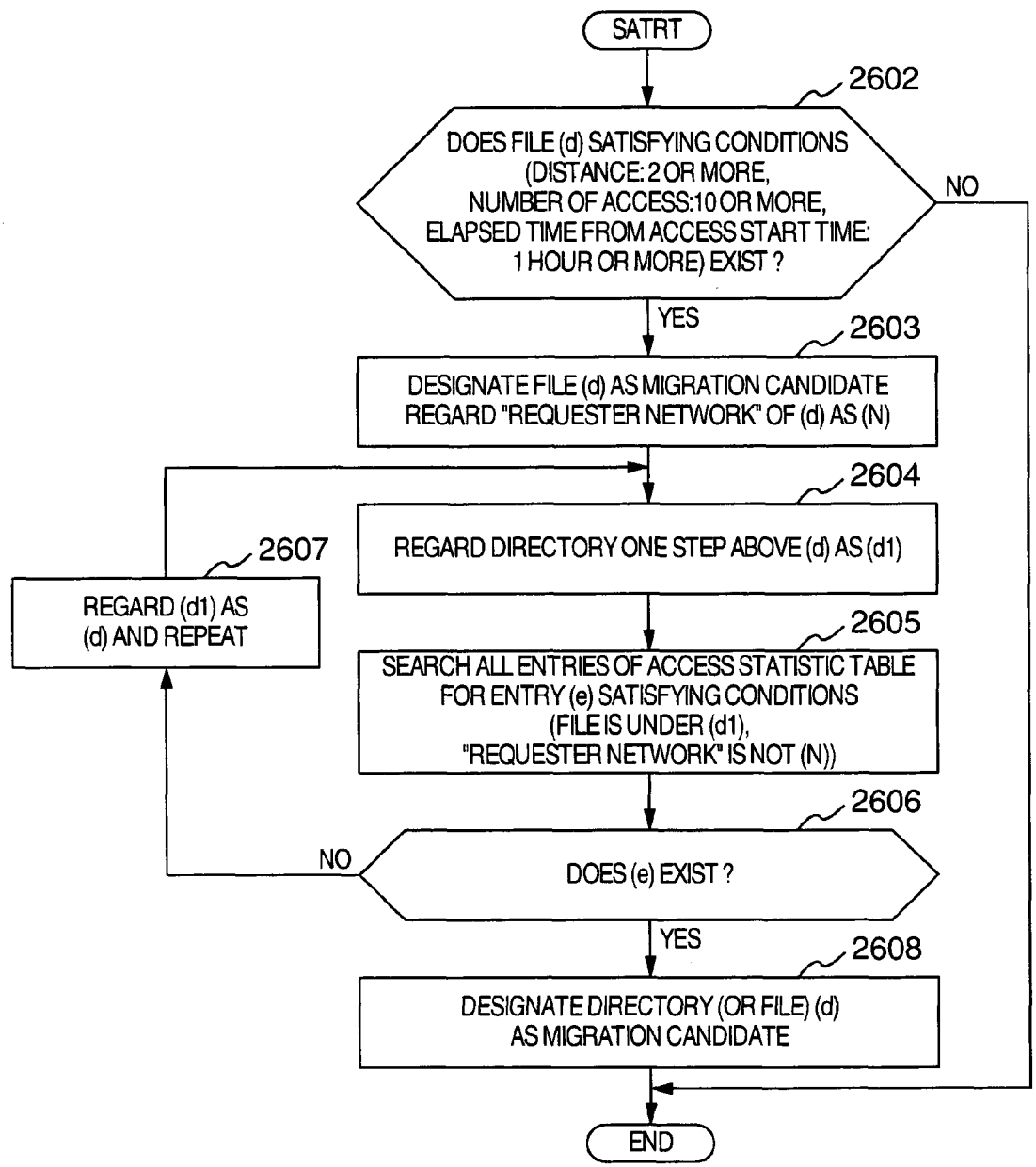
FIG. 22 is a flow chart showing an example of a process for determining a migration candidate directory.

FIG. 22 is a flow chart showing a process conducted by the file server 105 for checking the contents of the access statistics table 122. The process is carried out by the file server 105 at preset time periods by executing the file system program 120.

The file server 105 checks the access statistics table 122 at preset time periods and judges whether or not there exists a directory whose files (files under the directory) are frequently accessed by a particular network group. If such a directory is found, the file server 105 designates the directory as a candidate for the migration directory.

Specifically, the file server 105 searches the access statistics table 122 (shown in FIG. 23) for a file satisfying the following conditions:

D. The distance between a network group including the file server 105 and a network group accessing the file is 2 or more;
E. The number of accesses is 10 or more; and
F. The time difference between the access start time and the current time is a prescribed time period (e.g. 1 hour) or more (that is, no access from other network groups occurred during the period).

The file found out by this step will be referred to as "file (d)". In this example, the file "/doc/misc/record.out" fulfilling the above conditions is selected as the file (d) (step 2602). Incidentally, the conditions for selecting the file (d) are not limited to the above particular conditions, and the above variables such as thresholds, preliminarily set in the file system program, can also be altered by the user.

If a file (d) is found in the access statistics table 122 (YES in the step 2602), the file server 105 recognizes a directory including the file (d) ("/doc/misc/" in the example of FIG. 23) as a "directory (d1)", while recognizing a network registered with a requester network field corresponding to the file (d) ("100.0.0.0/24" in the example of FIG. 23) as a network (N) (steps 2603, 2604).

Subsequently, the file server 105 searches all entries of the access statistics table 122 for an entry satisfying the following conditions:

G. The file (registered with the "accessed file path" field) exists under the directory (d1); and
H. The network registered with the requester network field is not the network (N).

The entry found out by the above search will be referred to as "entry (e)". In the example of FIG. 23, no entry (e) is found (step 2605).

If an entry (e) is found (YES in step 2606), it means that the directory (d1) includes two or more files accessed by different network groups. In this case, transferring all the files under the directory (d1) might deteriorate the total performance of the system, therefore, the file server 105 gives up the transfer of the directory (d1) and designates the file (d) as the candidate for the migration file (step 2608).

If no entry (e) is found (NO in step 2606), it means that the files under the directory (d1) have not been accessed by network groups other than the network (N), therefore, the file server 105 can designate the directory (d1) as the candidate for the migration directory.

Further, there is a possibility of designating a directory one step above the directory (d1) ("/doc/" in the example of FIG. 23) as a candidate for the migration directory. Therefore, the file server 105 regards the directory (d1) as new (d) (regards the directory one step above the directory (d1) as new (d1)) (step 2307) and repeats the process from the step 2604, that is, the file server 105 searches all entries of the access statistics table 122 for an entry satisfying the following conditions:

I. The file (registered with the accessed file path field) exists under the new directory (d1); and J. The network registered with the requester network field is not the network (N).

The entry found out by the above search is regarded as the entry (e). In the example of FIG. 23, an entry of the file "/doc/memo/.txt" is found as the entry (e).

The file server 105 repeats the above loop and stops the repetition at the point when an entry (e) is found. The directory (or file) (d) which has been found at the point is designated as the candidate for the migration directory (or migration file) (step 2308) and the process is ended.

Also in the second embodiment transferring files in units of directories, the actual transfer of each file is conducted when the migration target server received an access request from a client 103, as in the first embodiment (see FIG. 14). Therefore, the files are transferred on the networks 101 one by one as the need arises without sending all the files of the migration directory at once, by which the traffic on the network 101 and the load on the file servers 105 can be dispersed.

In the following, a third embodiment of the present invention will be described in detail. In the first embodiment, the migration source server selected the migration target server from file servers 105 of a network group frequently making access to the file. Therefore, the file transfer was not carried out in the first embodiment when a file server 105 satisfying the conditions (free space larger than specified capacity, the same administrator as the migration source server, etc.) can not be found in the network group frequently accessing the file.

In the third embodiment, when no file server 105 fulfilling the conditions is found in the frequently accessing network group, the migration source server checks whether or not a file server 105 satisfying conditions exists in another network group and transfers the file to the file server 105 as the second best solution if the file server 105 satisfies the conditions.

Figure 24:
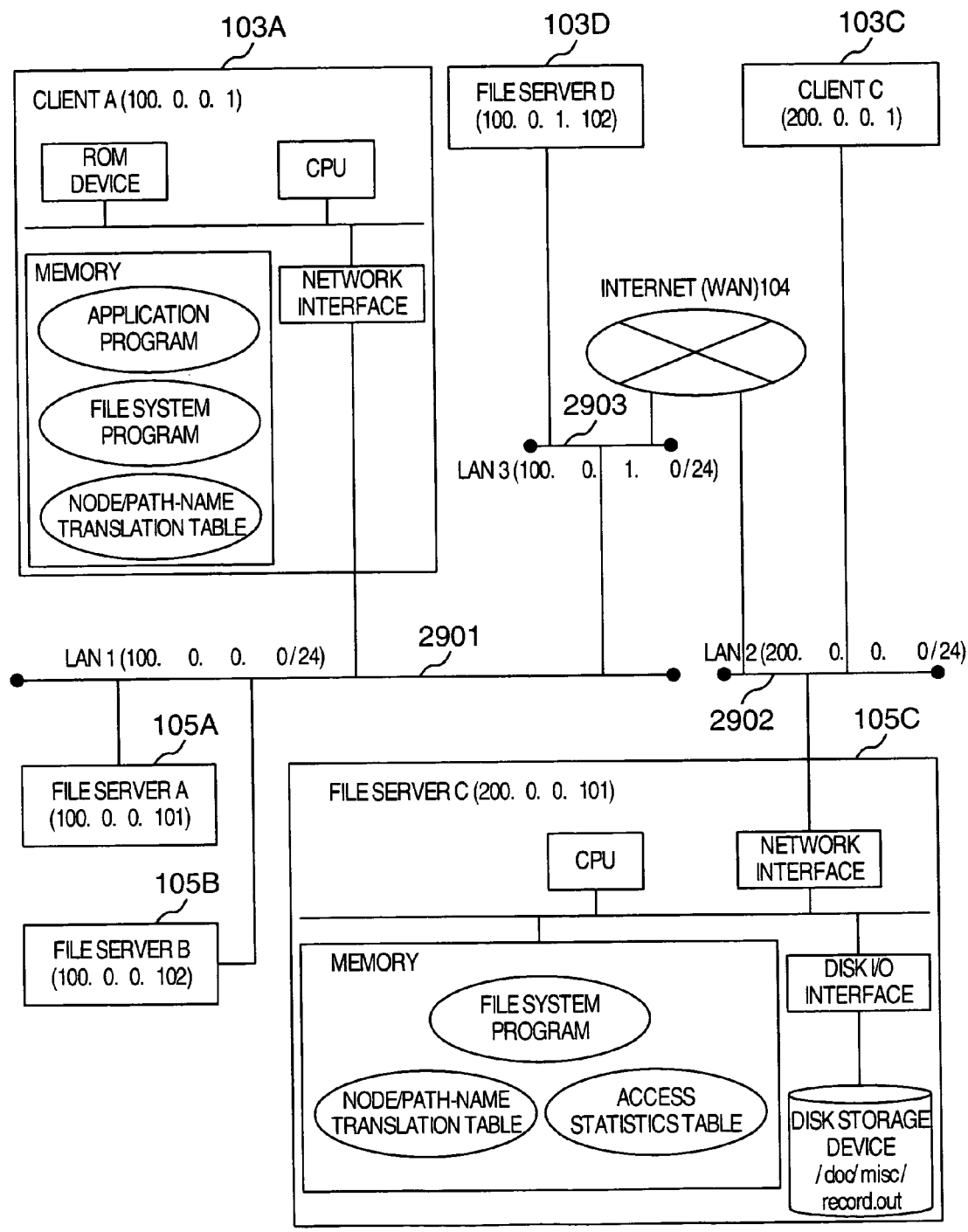
FIG. 24 is a block diagram showing a network system in accordance with a third embodiment of the present invention.

FIG. 24 is a block diagram showing the composition of a network system in accordance with the third embodiment of the present invention, in which two networks LAN1 and LAN3 are connected by a WAN such as the Internet, and a LAN2 is connected to the LAN3 by the Internet 104. The LAN1 and LAN2 are connected via the LAN2.

Processes conducted in the third embodiment, except the following migration target server selection process, are basically the same as those of the first embodiment, and thus repeated description thereof is omitted for brevity. The migration target server selection process employed in the third embodiment will be explained below.

Figure 25:
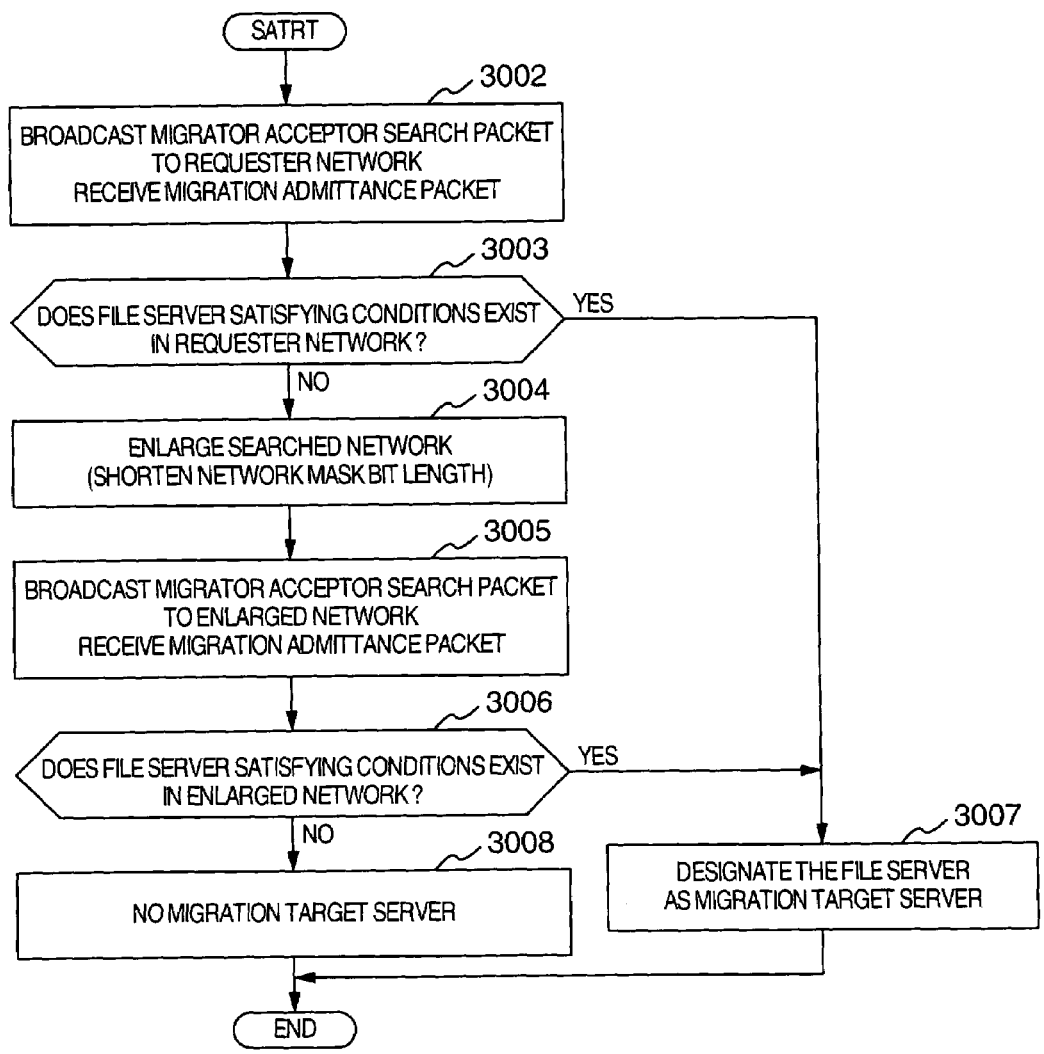
FIG. 25 is a flow chart showing an example of a migration target server selection process.

FIG. 25 is a flow chart showing the migration target server selection process conducted by the migration source server when it selected a candidate for the migration file. The following explanation will be given assuming that the file server 105C shown in FIG. 24 is the migration source server.

The migration source server 105C which selected the migration candidate file refers to the access statistics table 122 and broadcasts the migrator acceptor search packet to the network (100.0.0.0/24: LAN1) corresponding to the network group frequently accessing the migration candidate file (step 3002).

The migration source server checks returned migration admittance packets and judges whether they satisfy the predetermined conditions. In this example, migration admittance packets are returned from the file servers 105A and 105B connected to the LAN1, and the migration source server checks whether or not the migration admittance packets satisfy the conditions (free space larger than specified capacity, the same administrator as the migration source server, etc.) (step 3003).

If none of the migration admittance packets fulfills the conditions (NO in the step 3003), the migration source server enlarges the target (networks) of the broadcast of the migrator acceptor search packet. Specifically, the migration source server shortens the network mask bits of the network (LAN1) as the target of the broadcast of the migrator acceptor search packet (from 24 bits (255.255.255.0) to 16 bits (255.255.0.0) in this example), and broadcasts the migrator acceptor search packet to the LAN3 (100.0.1.0/24) having the same upper 16-bit address as the LAN1 (steps 3004, 3005).

Consequently, a migration admittance packet is returned to the migration source server from a file server 105D (100.0.1.102) of the LAN3. The migration source server checks whether or not the packet satisfies conditions (step 3006). If the migration admittance packet from the file server 105D satisfies the conditions (YES in the step 3006), the migration source server designates the file server 105D as the migration target server (step 3007). If no file server 105 satisfying the conditions exists in the enlarged broadcast target network, the migration source server judges that there exists no migration target server and does not conduct the file transfer (step 3008).

By the third embodiment, even when the migration target server can not be found in the network group frequently accessing the file, the migration source server is allowed to transfer the file to a file server 105 of another network group as the second best solution.

As set forth hereinabove, by the present invention, accessibility to a file managed by a file server distant from the client (access requester) can be improved and total access performance of the network system can be upgraded. Further, differently from the cache method, the consistency control is unnecessary and no extra traffic for the consistency control is caused to the network.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A computer system comprising a first network, a first computer connected to the first network, a second network connected to the first network, and a second computer and a third computer connected to the second network, the first computer comprising:

a communication interface for connecting the first computer to the first network;

a disk storage device for storing data;

a disk interface for communicating data with the disk storage device;

a CPU for controlling the first computer; and a memory for storing data and program code for operating the CPU, wherein the program code includes:

a module for recording situations of access to a file stored in the disk storage device from the third computer, the module being executed by the CPU at predetermined intervals, and wherein the program code is executed depending on the access situation, the program code further including:

a module for searching the second network connected to the third computer;

a module for searching a candidate for migration for the second network;

a module for designating the file as the candidate for migration to the second computer;

a module for transmitting a migrator acceptor search packet to the second computer for inquiring whether or not the second computer can accept the file in accordance with a requested storage capacity;

a module for receiving a reply packet from the second computer as a response to the migrator acceptor search packet;

a module for transmitting an advertisement packet to the third computer either after or before the file is transferred to the second computer, the advertisement packet indicating that the file is transferred to the second computer;

a module for transferring the file to the second computer;

a module for storing information indicative of whether the file has been transferred to the second computer or the file exists in the first computer;

a module for storing a path name for the second computer when the file has been transferred to the second computer;

a module for allowing the third computer to access the file via the first computer based on the information and the path name when the first computer receives an access request from the third computer for the file after the file has been transferred to the second computer;

a module for receiving a return request packet from the second computer and issuing a read request in response, for returning the file to the first computer; and a module for receiving and storing the file in the first computer, when the file is returned from the second computer.

2. The computer system according to claim 1, wherein:

the memory stores a path of the file accessed by the third computer associating the path with information on the access situations of the third computer, and the program code further includes a module for designating the file corresponding to the access situation information as the candidate for migration when the information satisfies a predetermined condition.

3. The computer system according to claim 2, wherein the third computer comprises a memory for storing data and program code, and the program code in the memory of the third computer includes a module for receiving the advertisement packet and a module for making access to the second computer for the file according to the advertisement packet.

4. The computer system according to claim 1, wherein:

the first network is further connected to a third network, and the program code further includes a module for transmitting the migrator acceptor search packet to the third network when no computer suitable for accepting the file is found in the second network.

5. The computer system according to claim 1, wherein the program code further includes a module for transferring a directory belonging to the file to the second computer.

6. The computer system according to claim 1, wherein the program code further includes a module for transmitting the path name when the first computer receives an access request for the file.

7. The computer system according to claim 1, wherein the file is stored into the second computer when the file is transferred from the first computer to the second computer.

8. The computer system according to claim 1, wherein the file is returned from the second computer to the first computer depending on another access situation.

9. The computer system according to claim 8, wherein the program code further includes a module for deleting the path name when the file is retuned from the second computer to the first computer.

10. The computer system according to claim 1, wherein the module for transferring the file to the second computer is performed if the response indicates that the second computer accepts the file and the second computer has a capacity for storing the file.

11. The computer system according to claim 1, wherein the first computer transfers the file to the second computer, according to the access request for the file or according to reduction of an amount of the access packet, after the advertisement packet is sent.

12. A first computer which is connected to a first network capable of communicating with a second network including a second computer and a third computer and which has a file accessed by the third computer, comprising:

a communication interface for connecting the first computer to the first network;

a CPU for controlling the first computer;

a disk storage device for storing data;

a disk interface for communicating data with the disk storage device; and a memory for storing data and program code for operating the CPU, wherein the program code includes:

a module for recording situations of access to a file stored in the disk storage device from the third computer, and wherein the program code is executed depending on the access situation, the program code further including:

a module for searching the second network connected to the third computer;

a module for searching a candidate for migration for the second network;

a module for designating the file as the candidate for migration to the second computer;

a module for transmitting a migrator acceptor search packet to the second computer for inquiring whether or not the second computer can accept the file in accordance with a requested storage capacity;

a module for receiving a reply packet from the second computer as a response to the migration admittance packet;

a module for transmitting an advertisement packet to the third computer either after or before the file is transferred to the second computer, the advertisement packet indicating that the file is transferred to the second computer;

a module for transferring the file to the second computer a module for storing information indicative of whether the file has been transferred to the second computer or the file exists in the first computer;

a module for storing a path name for the second computer when the file has been transferred to the second computer;

a module for allowing the third computer to access the file via the first computer based on the information and the path name when the first computer receives an access request from the third computer for the file after the file has been transferred to the second computer;

a module for receiving a return request packet from the second computer and issuing a read request in response, for returning the file to the first computer; and a module for receiving and storing the file in the first computer, when the file is returned from the second computer.

13. A program stored in a memory of a first computer which is connected to a first network capable of communicating with a second network including a second computer and a third computer and which has a file accessed by the third computer, comprising:

a first subroutine and a second subroutine, wherein the first subroutine includes a module for recording situations of access to the file of the first computer from the third computer, and wherein the second subroutine is executed depending on the access situation, the second subroutine including:

a module for searching the second network connected to the third computer;

a module for searching a candidate for migration for the second network;

a module for designating the file as the candidate for migration to the second computer;

a module for transmitting a migrator acceptor search packet to the second computer for inquiring whether or not the second computer can accept the file in accordance with a requested storage capacity;

a module for receiving a migration admittance packet from the second computer as a response to the migration admittance packet;

a module for transmitting an advertisement packet to the third computer either after or before the file is transferred to the second computer, the advertisement packet indicating that the file is transferred to the second computer;

a module for transferring the file to the second computer;

a module for storing information indicative of whether the file has been transferred to the second computer or the file exists in the first computer;

a module for storing a path name for the second computer when the file has been transferred to the second computer;

a module for allowing the third computer to access the file via the first computer based on the information and the path name when the first computer receives an access request from the third computer for the file after the file has been transferred to the second computer;

a module for receiving a return request packet from the second computer and issuing a read request in response, for returning the file to the first computer; and a module for receiving and storing the file in the first computer, when the file is returned from the second computer.

14. A method of operating a computer system server comprising a first computer connected to a first network through a communication interface, such that a second network is connected to the first network and such that second and third computers are connected to the second network, the method comprising:

recording situations of access from the third computer to a file stored in a disk storage device that communicates with the first computer through a disk interface, the recording of situations of access being executed at predetermined intervals depending on the access situation;

searching the second network connected to the third computer;

searching a candidate for migration for the second network;

designating the file as the candidate for migration to the second computer;

transmitting a migrator acceptor search packet to the second computer for inquiring whether or not the second computer can accept the file in accordance with a requested storage capacity;

receiving a reply packet from the second computer as a response to the migrator acceptor search packet;

transmitting an advertisement packet to the third computer either after or before the file is transferred to the second computer, the advertisement packet indicating that the file is transferred to the second computer;

transferring the file to the second computer;

storing information indicative of whether the file has been transferred to the second computer or the file exists in the first computer;

storing a path name for the second computer when the file has been transferred to the second computer; and allowing the third computer to access the file via the first computer based on the information and the path name when the first computer receives an access request from the third computer for the file after the file has been transferred to the second computer;

receiving a return request packet from the second computer and issuing a read request in response, for returning the file to the first computer; and receiving and storing the file in the first computer, when the file is returned to the first computer from the second computer.

15. The method according to claim 14, further including:
transferring a directory belonging to the file to the second computer.

16. The method according to claim 14, further including:
transmitting the path name when the first computer receives an access request for the file.

17. The method according to claim 14, further including:
storing the file into the second computer when the file is transferred from the first computer to the second computer.

* * * * *